Dec. 3, 1963 F. GOULET ETAL 3,112,523
AUTOMATIC STOCKMOLD AND CURING PRESS
Filed May 31, 1960 2 Sheets-Sheet 1
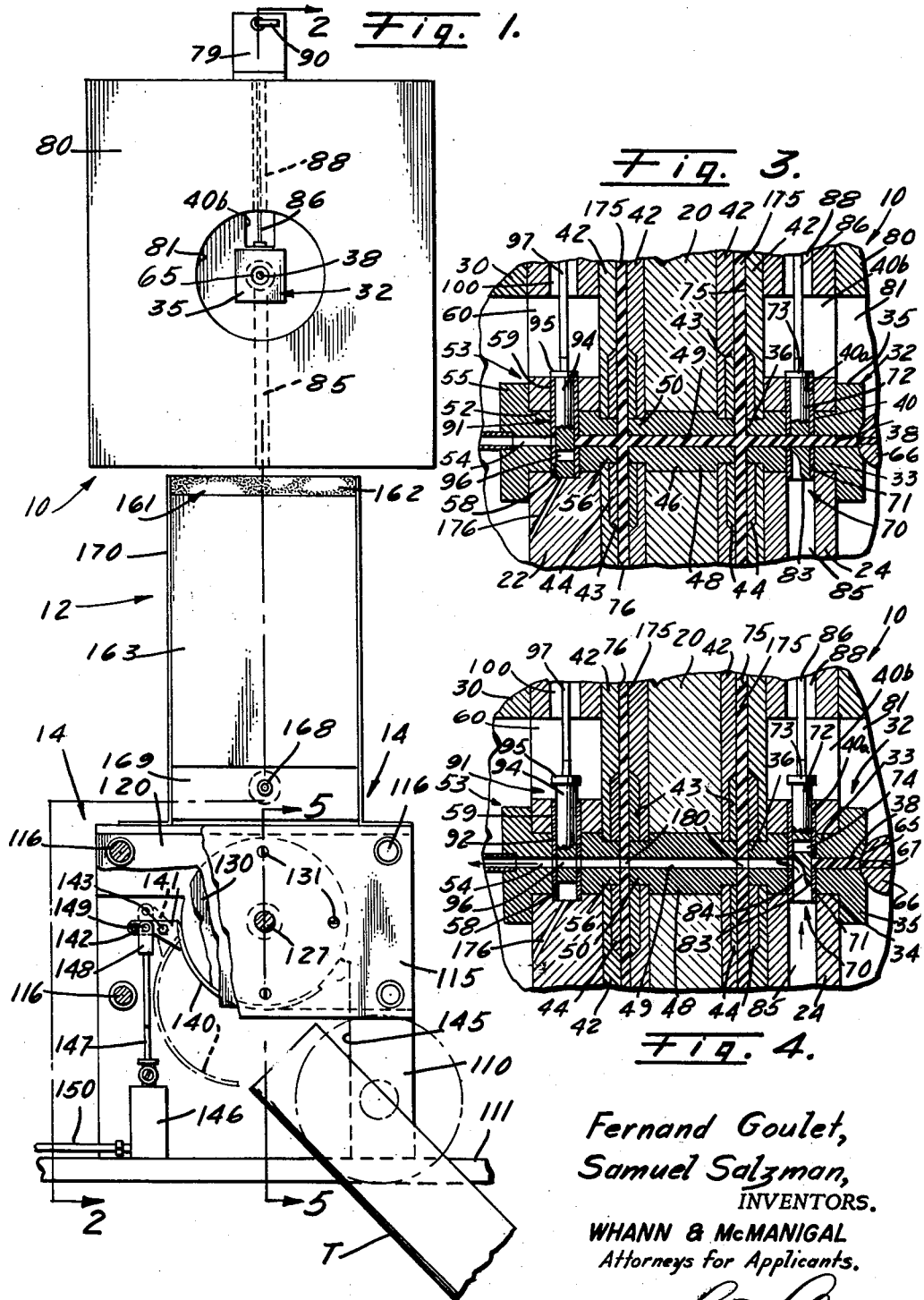
Fernand Goulet,
Samuel Salzman,
INVENTORS.
WHANN & McMANIGAL
Attorneys for Applicants.

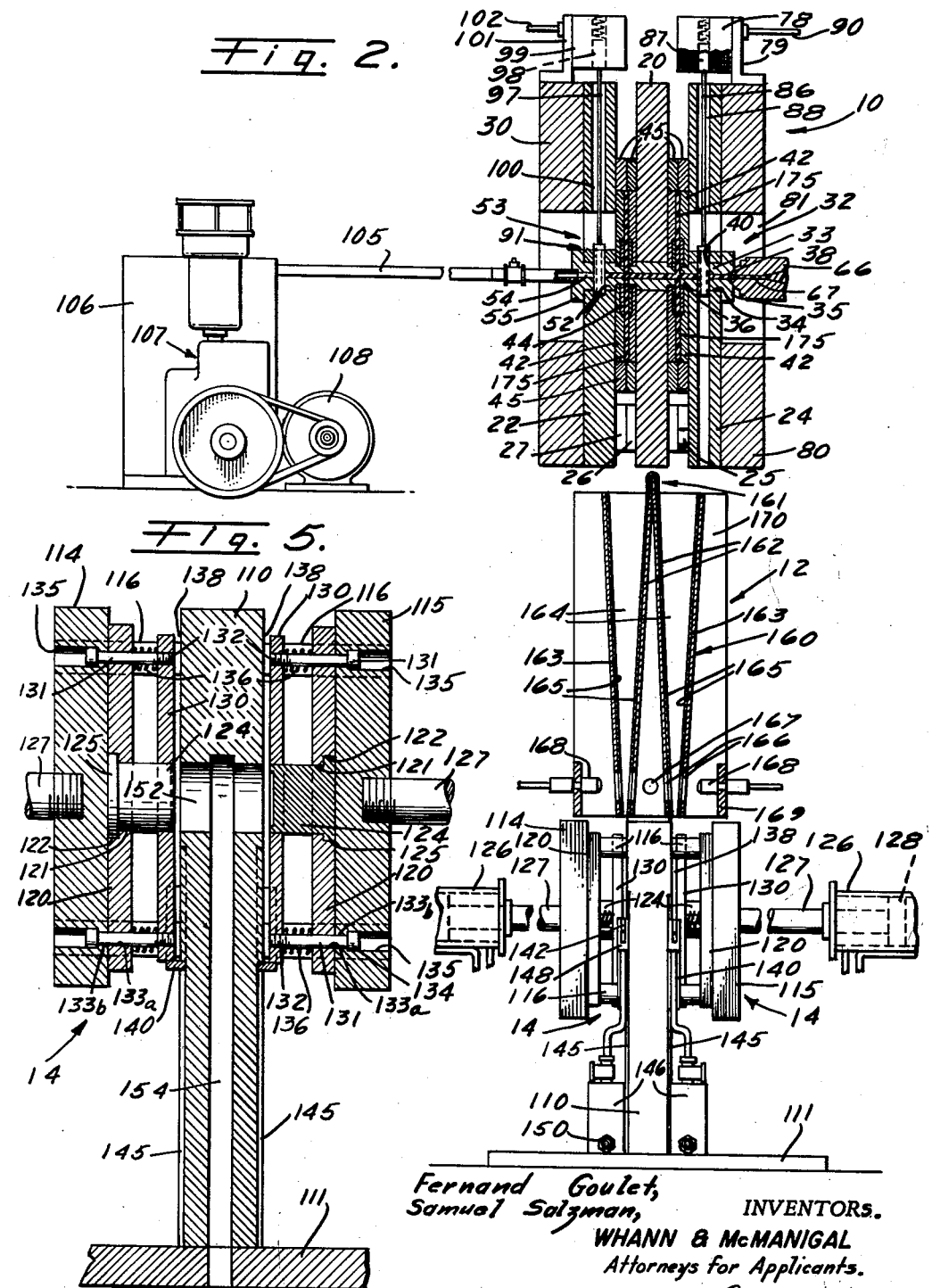

United States Patent Office 3,112,523
Patented Dec. 3, 1963

3,112,523
AUTOMATIC STOCKMOLD AND CURING PRESS
Fernand Goulet, Lynwood, and Samuel Salzman, Van Nuys, Calif., assignors to Allied Record Manufacturing Company, Hollywood, Calif., a corporation of California
Filed May 31, 1960, Ser. No. 33,046
6 Claims. (Cl. 18—5.3)

This invention relates generally to plastic molding apparatus and relates more particularly to apparatus for producing molded plastic parts.

While the invention has particular utility in the production of disc phonograph records, and is shown and described in such connection, it is to be understood that its utility is not confined thereto.

Certain types of plastic parts, such as phonograph records and the like, have an opening therein and certain problems are encountered in producing such plastic parts.

It is therefore an object of the present invention to provide improved apparatus which will solve said problems.

It is another object of the invention to provide apparatus for mass producing such plastic parts at high speed.

It is still another object of the present invention to provide plastic injection molding apparatus for forming said plastic parts.

It is a further object of the invention to provide plastic injection molding apparatus of this character having improved means for forming or producing the central hole in disc phonograph records.

It is a still further object of the invention to provide an automatic center punch curing means. This is particularly important in the manufacture of long-playing records which have a large central hole, such as the 45 r.p.m. records.

Another object of the invention is to provide apparatus of this character which will increase the speed of producing disc phonograph records.

Still another object of the invention is to provide apparatus of this character for producing disc phonograph records at relatively low cost.

A further object of the invention is to provide apparatus of this character that is relatively simple in construction and operation.

The characteristics and advantages of the invention are further sufficiently referred to in connection with the following detailed description of the accompanying drawings, which represent one embodiment. After considering this example, skilled persons will understood that many variations may be made without departing from the principals disclosed, and we contemplate the employment of any structures, arrangements, or modes of operation that are properly within the scope of the appended claims.

Referring to the drawings, which are for illustrative purposes only:

FIG. 1 is a side elevation of injection molding apparatus embodying the present invention, portions being broken away to show interior parts;

FIG. 2 is a sectional view taken on line 2—2 of FIG. 1 showing the stockmold dies in the closed position;

FIG. 3 is an enlarged fragmentary sectional view of the stockmold with the dies in the closed position and the control valves positioned for filling the mold cavities;

FIG. 4 is a view similar to FIG. 3 but showing the valves positioned for removing the sprue and forming central openings in the records; and FIG. 5 is an enlarged sectional view taken on line 5—5 of FIG. 1.

Referring more particularly to the drawings, there is shown molding apparatus, indicated generally at 10, a plurality of record guides, indicated generally at 12, below said molding apparatus 10, and below the record guides there is a press, indicated generally at 14.

The stockmold, or molding apparatus 10, includes a center mold plate 20 and outer mold plates 22 and 24 at opposite sides of the center mold plate and spaced laterally from the respective sides thereof.

At the bottom of the mold apparatus there is a leader pin 25 having one end fixed in the end plate 24, said pin 25 extending laterally therefrom. Mold plate 24 is fixed and the center mold plate 20 is provided with a bearing 26 slidable on the leader pin 25. Outer mold plate 22 is provided with a bearing 27 which is also slidable on the leader pin 25. Thus the center mold plate and the outer mold plate 22 are movable in the well-known manner, the outer mold plate 22 being connected to a die head 30 which, in turn, is connected to the usual hydraulic actuator mechanism, not shown.

Mold plate 24 is provided with an inlet bushing, indicated generally at 32, said bushing including a part 33 fixed in the usual manner in an opening 34 located centrally in said mold plate 20 and extending therethrough. At the outer end of the inlet bushing there is a flange 35 received snugly against the outer side of the mold plate 20. The inner end of the inlet bushing is provided with a reduced diameter portion 36 which projects inwardly of the inner face of said mold plate 20. Bushing 32 is provided with an axial passage 38 therethrough and a cross-bore 40 of substantially larger diameter extending vertically and intersecting said passage 38. Cross-bore 40 is aligned with a bore 40a in the mold plate 24 communicating at its upper end.

On the reduced diameter portion 36 of the inlet bushing 32 there is disposed, in the usual manner, a stamper 42 which has a central, annular recess 43 in the inner side thereof. A center clamping ring 44 is disposed in said recess 43 and is fixed on the inner end portion of the reduced diameter part 36 of the inlet bushing. The stamper 43 is provided on its inner face with the usual sound track groove and on the periphery of said stamper there is secured a clamping ring 45, FIG. 2, which is somewhat greater in thickness than the thickness of the stamper 42 and the center clamping ring 44.

The center mold plate 20 is also provided with a central opening 46 aligned with the opening 34 in the outer mold plate 24 in which is fixed a center bushing 48 having an axial or longitudinally extending passage 49 therethrough. At each end of the center bushing 48 there is a longitudinally extending reduced diameter part 50 on which is disposed stampers 42 which are of the same construction as the stamper 42 previously described. The stampers 42 for the center mold plate 20 are fixed on the respective reduced diameter portions 50 of the center bushing 48 and each of said stampers 42 is provided with the annular central recess in the outer side in which is disposed a center clamping ring 44 of the same construction as the center clamping ring already described. A clamping ring 45 is also provided on the periphery of the stampers 42 of the sides of the mold plate 20.

Mold plate 22 has opening 52 therethrough aligned with the opening 46 of the center mold plate for reception of an end bushing, indicated generally at 53, said bushing 53 being provided with an axially extending opening 54 and has an annular flange 55 at the outer end. The inner end of the bushing 53 is provided with a reduced diameter portion 56 on which is disposed a stamper 42 having an annular central recess 43 in which is received a center clamping ring 44, there also being provided a clamping ring 45, FIG. 2, peripherally attached to the stamper 42 of the outer mold plate 22. The bushing 53 is also provided with a cross-bore 58 which intersects the bore 54 of said bushing and which is aligned with a similar opening 59 in the mold plate 22, the upper end of the bore or opening 59 communicating with an opening 60 in said mold plate.

The outer end of the inlet bushing 32 has a concave recess 65 communicating with the passage 38 of said bushing, recess 65 tightly receiving, in the usual manner, the discharge end of a nozzle which has a plastic flow passage 67 therethrough communicating with the passage 38 of the inlet bushing. Nozzle 66 is connected in the usual manner to the injection system of the injection molding machine, said system not being shown since it does not constitute a part of the present invention.

Flow of material through the passage 38 of the inlet bushing 32 and, hence, through the passage 49 of the bushing 48 and into the mold cavities is controlled by an inlet valve indicated generally at 70. This valve comprises a tubular body 71 secured by any suitable means such as a press fit in the cross-bore 40 of the inlet bushing 32 and the bore 40a of the mold plate 24, body 71 having oppositely arranged openings therein communicaing with the adjacent ends of the bore or passage 38 of the inlet bushing.

Within the body 70 there is slidably disposed a movable valve member 72 having a flange 73 at its upper end for limiting downward movement of said valve member. There is a passage 74 extending diametrically across the movable valve member 72 and adapted, when the valve member 72 is at its downward limits of movement, as determined by the flange 73, to connect the oppositely arranged openings in the body 71 to thereby connect the portions of passage 38 of inlet bushing 32 together to form a continuous passage for the flow of fluid plastic material through the inlet bushing 32, into the mold cavity 75 defined by the stampers and center clamping rings at the inner side of the mold plate 24 and adjacent side of the center mold plate 20. The plastic material will also flow through the passage 49 and into the mold cavity 76 defined by the stamper 42 and center clamping ring 44 at the inner side of the mold plate 22 and the adjacent side of the inner mold plate 20.

The movable valve member 72 of the valve 70 is actuated by a solenoid 78 disposed at the upper end of the mold plate 24 and secured by means of a bracket 79 to the upper end of a die head 80 at the outer side of the mold plate 24. The die head 80 is provided with a large opening 81 for reception of the nozzle 66. When energized, the solenoid 78 effects raising of the movable valve member 72 to a position whereat a lower end portion 83 of the valve member 72 closes the opening in the valve body 71 communicating with the outer end portion of the passage 38 of the inlet valve. The lower end portion of said movable valve member is relieved at 84 so that when the movable valve member is in the raised position, as shown in FIG. 4, there is a connection with atmosphere through a passage 85 which extends downwardly from the valve 70 through the mold plate 24. The movable valve member 72 is connected by a rod 86 with the armature 87 of the solenoid 78, said rod 86 extending through a bore 88 from the opening 40b of the mold plate 24 to the upper end thereof, as best shown in FIG. 2. Control of the solenoid 78 is effected by any suitable well known mechanism, said solenoid 78 being connected with said mechanism by means of wires 90.

An outlet valve, indicated generally at 91, is provided in the cross-bore 58 of the bushing 53 in mold plate 22, said valve having a tubular body 92 secured by press fitting or otherwise in said cross-bore 58 and the bore 59 in the adjacent portion of the mold plate 22. Body 92 is also provided with openings at opposite sides thereof, communicating with adjacent portions of the passage 54 in the bushing 53. A movable valve member 94 is slidable in the body 92 and has a flange 95 at the upper end thereof to limit downward movement. Movable valve member 94 is provided with a diametrical opening 96 which, when said valve member is in its upper position, as shown in FIG. 4, connects the diametrical openings of the body 92 and, hence, with the parts of the passage 54 at opposite sides of the valve 91. However, when the valve member 94 is in its lower position communication through the passage 54 is cut off, as shown in FIG. 3. Valve member 94 is connected by means of a rod 97 to the armature 98 of the solenoid 99 at the upper end of mold plate 22, said rod 97 extending through a passage 100 in mold plate 22 between the opening 60 thereof and the upper end. Solenoid 99 is attached, by means of a bracket 101, to the top of die head 30 and electrically connected by wires 102 to a suitable control mechanism, not shown.

The outer end of passage 54 of bushing 53 is connected by means of a conduit 105 to the upper end of a vacuum tank 106 in which a vacuum is produced by a vacuum pump 107 operated by a motor 108, or by any other suitable means. The vacuum pump may be of any suitable well known type.

The press 14 is disposed below the stockmold 10 and records formed by the stockmold are dropped into the press for additional curing. The press is also provided with means for punching the required large central holes in 45 r.p.m. long-playing records.

The press includes a central curing plate 110, the lower end of which is mounted by any suitable well known means on a support or base 111. At opposite sides of the upper end of the center curing plate 110 there are outer curing plates 114 and 115, respectively. Plates 114 and 115 are slidable toward and away from the center curing plate on guide posts 116 which have their inner ends secured to the center curing plate by any well known means. There are four guide posts 116 at each side of the center curing plate, one adjacent each corner of the respective outer curing plates. The guide posts are slidably received in openings provided therefor in said outer curing plates.

Attached, by any suitable means such as screws, not shown, to the inner side of the outer curing plates 114 and 115 are stripper plates 120. The stripper plates have central openings 121 therein with an enlarged portion 122 at the outer sides adjacent the inner side of the respective outer curing plates, said opening 121 receiving the outer end portion of a male punch 124, punch member 124 having an outwardly extending annular flange 125 which is received in the enlarged portion 122 of the opening 121. Thus the punch member 124 is secured to the outer curing plate and stripper plate assembly. Each of the outer curing plates is connected with a respective hydraulic actuating mechanism 126 by means of a connecting rod 127. One end of the rod 127 is screwed into a tapped opening provided therefor in the outer side of the respective outer curing plate and the other end of said rod is connected in the usual manner with an actuating piston 128 of the hydraulic mechanism 126. The latter may be of any suitable well known character and is adapted to actuate the outer curing plate to which it is attached and the stripper plate attached to said curing plate toward and away from the center curing plate.

There is a plate 130 at each side of the center curing plate and attached to the adjacent outer curing plate and stripper plate by means of bolts 131 which have threaded ends 132 screwed into tapped openings provided therefor in said plates 130. The plate 130 is spaced from the adjacent stripper plate and the bolts 131 are received in openings 133a and 133b provided therefor in the respective stripper plate and outer curing plate. Bolts also are provided with enlarged heads 134 which are slidably movable in counterbores 135 at the outer ends of the bores for openings 133b. Springs 136 on the bolts 131 react between the stripper plate and adjacent plate 130 and resiliently urge the latter toward the center curing plate. Normally the outer curing plates and stripper plates and plates 130 are disposed as shown in FIG. 5, at which time the bolt heads 134 engage the inner ends of the counterbores 135 and the springs 136 hold the plates 130 in spaced relation to the adjacent sides of the center curing plate. The spaces 138 between the plates 130 and the adjacent sides of the center curing plate are record slots into which records pass after being released from the stockmold and guided downwardly by the record guides 12, which will be more particularly described hereinafter.

At the lower end of each record slot there is a record stop cradle 140 which is arcuate in shape and is provided at one end with a part or lever 141 extending radially outwardly and provided with a slot 142. The inner end of the lever 141 is provided with an opening for reception of a pivot screw 143 which is screwed into a tapped opening provided therefor in the adjacent side of the center curing plate. Each side of the center curing plate is recessed as at 145 to provide clearance for operative movements of the cradles.

There is means for operating each of the cradles and said means comprises a solenoid mechanism 146 secured to the base 111. Each solenoid is provided with the usual plunger or core arrangement, not shown, connected with a push rod 147 which carries a yoke 148 at its upper end, said yoke having a pin 149 across the arms thereof between which the slotted portion of lever 141 is received, said pin 149 extending through the slot 142 of lever 141, the slot 142 including operative movements of the mechanism. It is to be understood that when records are dropped into the record slots the cradles 140 are disposed in their upper position as best shown in FIG. 1. The solenoids 146 are connected to suitable control means of well known type by means of wires which pass through the conduits 150.

The punches 124 are adapted to enter an opening 152 through the center curing plate and the free peripheral edges of said punch members 124 cooperate with the outer free edges of the opening 152 to provide punching means for punching large central openings in records disposed in the record slots and clamped therein between the clamping plates 130 and the adjacent sides of the curing plate. It is to be understood, of course, that the punch members 124 also are slidably disposed in openings provided therefor in said clamping plates 130.

From the large opening 152 there extends downwardly through the center curing plate a passage 154 which is substantially wider than the diameter of the passage 152 and through which center portions punched from the records pass. The passage 154 is connected with a suitable source of vacuum, not shown, to aid in the removal of the punched central portions of the records.

The record guide means 12, disposed between the stockmold 10 and press 14 comprise a pair of record guides, indicated generally at 160. These guides are formed of any suitable sheet material and comprise a central member, indicated generally at 161, and formed in the shape of an inverted V, the side parts 162 thereof diverging downwardly from the apex at the upper end. At each side of the central member there is a side member 163 which defines, with the central member, a pair of passages 164 which are smaller at their lower ends than at the upper ends. The lower ends of passages 164 are open and are disposed in alignment with the record slots 138 of the press mechanism 14. The flaring upper ends of the passages 164 are disposed so as to receive records which have been formed by the stockmold and released therefrom.

The parts 161 and 163 are provided with felt facings 165 so that records dropped into the passages 164 will be protected against scratching or other damage.

The guide parts 161 and 163 have aligned openings 166 therein and a light 167 is disposed within the V of the guide part 161 adjacent the openings therein to provide illumination through said openings 166. At the outer side of the members 163 there is a photoelectric cell 168 secured in a support member 169, which form parts of end plates 170 of the guide means 12. The photoelectric cells are suitably connected to electrical control equipment of well known character so that the curing press will be operated in the well known manner, said photoelectric cells being aligned with the openings 166.

Referring to the stockmold, the stampers 42 are provided with the sound track grooves of well known character and as said stampers are somewhat thinner than the clamping ring 45, there is a space between adjacent stampers when the mold plates are closed, said space comprising the mold cavities 75 into which is injected suitable plastic material to form records 175.

In operation, starting with the stockmolds open, said molds are moved to the closed position. Valve 70 is in the open position, as shown in FIG. 3, and valve 91 is in the closed position, also as shown in FIG. 3. It is to be noted that in order to prevent pressures on the lower side of the movable valve member 94 of valve 91 such as might interfere with the proper operation of said valve member, there is a vent 176 to atmosphere.

With the mechanism as shown in FIG. 3 plastic heated to a sufficient temperature so that it will flow, is injected from the nozzle 66 through the passage 38 in the inlet bearing 32 and through the passages of the valve 70 into the first encountered mold cavity 75, and also through the passage 49 of the bushing 48 and into the other mold cavity. It is to be noted that such plastic material will also flow through the inner end of the passage 54 but further flow through said passage is prevented by the valve member 94 of valve 91, said valve being, of course, in the closed position.

When the mold cavities have been filled the valve 70 is moved to the closed position, as shown in FIG. 4, and the valve 91 is opened. The sprue in the aligned axial passages of the bushings 53 and 48 and the inner portion of the passage 38 of bushing 32 is then drawn therefrom into the tank 106 in which an adequate vacuum is maintained. It is to be understood, of course, that the tank 106 serves as a salvage bin and that the sprue material removed from the above referred to aligned bushing passages enters said tank, it drops to the bottom thereof, where it accumulates, and is later removed for reuse. The sprue material in said axially aligned bushing passages is readily removed by the vacuum in tank 106 and undesired resistance to movement of material from said alignment passages is relieved or prevented by the passage or connection between the inner portion of passage 38 and the passage 85 due to the relieved part 84 of valve member 72, so that atmospheric pressure is present behind the slug of sprue being removed. Removal of the sprue also provides the usual small central openings 180 in the records being formed.

After the sprue has been removed the stockmold is opened and the records formed therein drop into the respective passages 164 of the guides and when they pass the openings 166 they shut off the light to the photoelectric cells 168 to give the signal for the closing of the press. However, there is sufficient delay in the closing of the press to permit the records to drop into the record slots 138. At this time the cradles 140 are in the uppermost position and the records drop onto said cradles and are held in proper position in the record slots, so that when the press is closed and the punch members 124 are pushed inwardly into the opening 152, the large center openings which are thus punched in the records are at the axial center of said records. The material punched from the central portion of the records is pushed inwardly in the opening 152 and passes from said opening downwardly to the passage 154 by means of gravity assisted by the vacuum pull in said passage 154.

With the records properly cured and punched, the press is opened by the hydraulic mechanism which is controlled by suitable timing or control mechanism, and the solenoids 146 are operated to move the cradles 140 downwardly to their lower position, shown in dotted lines in FIG. 1, said records then rolling into the trough's T, FIG. 1. The troughs convey the records to a stacking station, where they are handled in the usual well known manner.

It is to be understood, of course, that certain types of records require only the small central openings and in the manufacture of such records the large punches 124 are not required. The records are formed with the small central openings by means of the vacuum action, above described, and pass through the guides and the press, the press then being provided with smaller punches to finish the small central openings.

It is also to be understood that the spacing of the guide posts 116 is such that records dropping from the guides pass between the upper guide posts 116 into the record slots and said records dropping from the press drop between the lower guide posts.

It is to be noted that the conduit or connection 105 between the bearing 53 and tank 106 may be arranged in any suitable manner to permit the operative movements of the parts of the stockmold. For example, the conduit may be arranged so that it will bend slightly with the slight movements of the stockmold parts, such bending being insufficient to interfere with the passage therethrough of the sprue material removed from the stockmold.

It is to be understood that the various parts of the stockmold which require heat are heated in accordance with well known practice. Included in the parts being heated are the valves 32 and 91. Thus the material in the axially aligned passages is maintained substantially fluid so that when the vacuum is applied at the outlet end of said passages the plastic material therein will flow outwardly of said passages and into the tank 106, leaving the passages clear and providing the openings 130 in the record discs.

The invention and many of its attendant advantages will be understood from the foregoing description and it will be apparent that various changes may be made in the form, construction, and arrangement of the parts of the mechanism and the method without departing from the spirit and scope thereof or sacrificing its material advantages, the embodiment hereinbefore described being merely for purposes of illustration.

We claim:

1. In plastic injection molding apparatus: a stockmold including three mold plates in side by side arrangement and mounted for relative movement toward and away from each other; means carried on adjacent faces of said plates defining axially aligned record disc molds; means for effecting said relative movements of said mold plates to thereby open and close said molds, there being aligned fluid flow passages through the parts constituting said stockmold, said passages being in axial alignment with the axes of said molds and connected therewith, there being at least a portion of one of said passages extending beyond the connections with said molds and comprising a sprue outlet portion; a tank having a connection with said sprue outlet portion; means connected with one end of one of said aligned openings for injecting plastic material into said openings and thence into said molds; an inlet valve having a control member controlling the connection between said injecting means and said molds, said member being movable between two positions respectively and when said member is in one of the said positions said injection means is connected with said passages and when said member is in the other position said injection means is cut off from said passages, said control member having a free end with an inclined surface out of alignment with said one end of one of said passages when said control member is at said one position and in alignment therewith when said control member is at said other position; means for selectively actuating said member between said positions; a second valve controlling flow through the sprue outlet portion, said second valve having an open position and a closed position; means for actuating said valve in the open position after the molds are closed, plastic material has been injected thereinto, and the inlet valve has been moved to its second position; a vacuum connected with said sprue outlet passage portion, vacuum being applied to said passages when the second valve is open, the molds are closed, and the inlet valve is in its second position, said vacuum thereby drawing sprue material from said aligned passages and into said tank; a curing press disposed directly beneath the stockmold and having a central curing plate and curing plates at the respective sides thereof mounted for relative movement toward and away from the central curing plate; punch means for punching large central openings in record discs disposed in the curing press, when side curing plates are moved toward the central curing plate; and means for discharging from the press material punched from said record discs.

2. In plastic injection molding apparatus: a stockmold including three mold plates in side by side arrangement and mounted for relative movement toward and away from each other; means carried on adjacent faces of said plates defining axially aligned record disc molds; means for effecting said relative movements of said mold plates to thereby open and close said molds, there being aligned fluid flow passages through the parts constituting said stockmold, said passages being in axial alignment with the axes of said molds and connected therewith, there being at least a portion of one of said passages extending beyond the connections with said molds and comprising a sprue outlet portion; a tank having a connection with said sprue outlet portion; means connected with one end of one of said aligned openings for injecting plastic material into said openings and thence into said molds; movable inlet valve means having a valve member for controlling the connection between said injecting means and said molds, said member being movable between two positions respectively and when said member is in one of the said positions said injection means is connected with said passages and when said member is in the other position said injection means is cut off from said passages, said valve member having a relieved free end portion out of alignment with said one end of one of said passages when said valve member is at said one position and in alignment therewith when said valve member is at said other position; means for selectively actuating said member between said positions; a second valve controlling flow through the sprue outlet portion, said second valve having an open position and a closed position; means for actuating said valve to the open position after the molds are closed, plastic material has been injected thereinto, and the inlet valve has been moved to its second position; and a vacuum source connected with said sprue outlet passage portion, vacuum being applied to said passages when the second valve is open, the molds are closed, and the inlet valve is in its second position, said vacuum thereby drawing sprue material from said aligned passages and into said tank.

3. In plastic injection molding apparatus: a stockmold including a plurality of mold plates in side by side arrangement and mounted for relative movement toward and away from each other; means carried on adjacent faces of said plates defining axially aligned record disc molds; means for effecting said relative movements of said mold plates to thereby open and close said molds, there being axially aligned passages through the parts constituting said stockmold, said passages comprising a plastic flow passage means in axial alignment with the axes of said molds and connected therewith, said flow passage means having an inlet end and an outlet end; means connected with the inlet end of said flow passage means for injecting plastic material thereinto and thence into said molds; movable inlet valve means having a valve member for controlling flow into said inlet end by said injecting means, said valve member being movable between two positions respectively and when said member is in one of said positions said injection means is connected with said flow passage means, and when said member is in the other position said injection means is cut off therefrom and said inlet end is connected with atmosphere; means for selectively actuating said valve member between said positions; an outlet valve controlling said outlet end and having an open position and a closed position; means for selectively actuating said outlet valve; and a source of vacuum connected with said outlet end for drawing sprue material from said flow passage means when the outlet valve is open and the inlet valve is in its second position.

4. In plastic injection molding apparatus: a stockmold including mold plates in side by side arrangement and mounted for relative movement toward and away from each other; means carried on adjacent faces of said plates defining a record disc mold; means for effecting said relative movements of said mold plates to thereby open and close said mold, there being axially aligned passage means through the parts constituting said stockmold, said passage means being connected with said mold, said flow passage means having an inlet and an outlet; means connected with the inlet of said flow passage means for injecting plastic material thereinto and thence into said mold; an inlet valve for controlling flow into said inlet by said injecting means, said valve having open and closed positions respectively; means for selectively actuating said valve; an outlet valve for controlling said outlet and having an open position and a closed position; means for selectively actuating said outlet valve; and a source of vacuum connected with said outlet end for drawing sprue material from said flow passage means when the outlet valve is open and the inlet valve is closed, said passage means being vented to prevent back pressure on said sprue material when it is being removed from said passage means.

5. In plastic injection molding apparatus: a stockmold including mold plates mounted for relative movement toward and away from each other to close and open a mold cavity; means for effecting said relative movements of said mold plates, there being passage means in the parts constituting said stockmold; an inlet end, and an outlet end adapted to be connected to a source of vacuum; means connected with the inlet end of said flow passage means for injecting plastic material thereinto and thence into said mold; an inlet valve for said passage means having an open position and a closed position, said passage being vented when said outlet end is connected to said source of vacuum; means for selectively actuating said valve; means for controlling the means for actuating said valve; an outlet valve for controlling said outlet and having an open position and a closed position; and means for selectively actuating said outlet valve.

6. In plastic injection molding apparatus: a stockmold including elements movable toward and away from each other, said elements, when closed, defining a mold cavity, there being passage means in said elements of said stockmold, said passage means having an inlet and an outlet; means connected with the inlet of said passage means for introducing plastic material into the mold cavity; and a source of vacuum operably arranged for removing sprue material from the molding apparatus and thereby forming an opening in the molded piece disposed in the mold cavity, said passage means being vented at its inlet end when effective vacuum is applied to said outlet end for removing the sprue material from the molding apparatus and forming an opening in the molded piece disposed in said mold cavity.

References Cited in the file of this patent

UNITED STATES PATENTS

| | | |
|---|---|---|
| 1,972,789 | Newkirk | Sept. 4, 1934 |
| 2,032,923 | Eldridge | Mar. 3, 1936 |
| 2,234,842 | Jordan | Mar. 11, 1941 |
| 2,578,457 | Somers | Dec. 11, 1951 |
| 2,589,185 | Almquist et al. | Mar. 11, 1952 |
| 2,642,621 | Amo | June 23, 1953 |

OTHER REFERENCES

Modern Plastics (page 3), vol. 35, No. 9, May 1958.